(12) United States Patent
New (10) Patent No.: US 9,594,394 B2
(45) Date of Patent: Mar. 14, 2017

(54) RECONFIGURABLE OPTICAL PROCESSING SYSTEM

(71) Applicant: OPTALYSYS LTD., Yorkshire (GB)

(72) Inventor: Nicholas James New, Yorkshire (GB)

(73) Assignee: OPTALYSYS LTD., Yorkshire (GB)

( * ) Notice: Subject to any disclaimer, the term of this patent is extended or adjusted under 35 U.S.C. 154(b) by 67 days.

(21) Appl. No.: 14/412,137

(22) PCT Filed: Jul. 4, 2013

(86) PCT No.: PCT/GB2013/051778
§ 371 (c)(1),
(2) Date: Dec. 30, 2014

(87) PCT Pub. No.: WO2014/087126
PCT Pub. Date: Jun. 12, 2014

(65) Prior Publication Data
US 2015/0301554 A1   Oct. 22, 2015

(30) Foreign Application Priority Data

Jul. 4, 2012   (GB) .................................. 1211917.8

(51) Int. Cl.
*G02F 3/00* (2006.01)
*G06E 3/00* (2006.01)

(52) U.S. Cl.
CPC ............. *G06E 3/003* (2013.01); *G02F 3/00* (2013.01)

(58) Field of Classification Search
CPC ...................................................... G02F 3/00
See application file for complete search history.

(56) References Cited

U.S. PATENT DOCUMENTS

| 6,804,412 B1* | 10/2004 | Wilkinson | ............ G06E 3/005 340/5.1 |
| 2005/0018259 A1* | 1/2005 | Holmes | ............ G02B 5/32 359/3 |
| 2010/0085496 A1* | 4/2010 | New | ............ G06E 3/003 349/17 |

FOREIGN PATENT DOCUMENTS

| WO | 9931563 A1 | 6/1999 |
| WO | 2004029746 A1 | 4/2004 |
| WO | 2008110779 A1 | 9/2008 |

OTHER PUBLICATIONS

Science and Technology Facilities Council "GungHo Daresbury Meeting Agenda"; Daresbury Campus; (Jul. 2012).
Zeng et al "Parallel lensless optical correlator based on two phase-only spatial light modulators"; Optical Express; vol. 9, No. 13; pp. 12594-12604 (Jun. 2011).

* cited by examiner

*Primary Examiner* — Kendrick Hsu
(74) *Attorney, Agent, or Firm* — Muncy, Geissler, Olds, & Lowe, PC (57) ABSTRACT

An optical processing system comprises an optical input; one or more spatial light modulator arrays; and a detector array; wherein at least of said spatial light modulator arrays incorporates a plurality of data elements focusing elements; said data elements and/or said focussing elements having multiple degrees of freedom.

17 Claims, 6 Drawing Sheets

RECONFIGURABLE OPTICAL PROCESSING SYSTEM

CROSS-REFERENCE TO RELATED APPLICATIONS

This application is the U.S. National Stage Entry under 35 U.S.C. §371 of International Application No. PCT/GB2013/051778, filed on Jul. 4, 2013, which claims priority to GB Patent Application No. 1211917.8, filed on Jul. 4, 2012.

FIELD OF THE INVENTION

The invention relates to optical processing. Certain embodiments of the invention concern optical correlation based processing systems, optical pattern recognition systems, optical derivative processing systems, optical equation solving systems, and optical systems for mathematical operations.

BACKGROUND TO THE INVENTION AND PRIOR ART KNOWN TO THE APPLICANT(S)

In coherent processing systems such as optical correlators, a laser or other coherent source is typically employed to be modulated in either phase or amplitude by one or more spatial light modulator (SLM) devices. These typically incorporate liquid crystal devices but may also be micro-mirror microelectromechanical (MEMs) devices. Optical correlator devices are typically used as optical pattern recognition systems, such as the systems described in EP1546838 (WO2004/029746) and EP1420322 (WO99/31563). Both of these prior art documents are incorporated by reference. In a 4f Matched Filter or Joint Transform Correlator (JTC) system, the SLM devices are addressed with functions that represent either input or reference patterns (which can be images) and/or filter patterns, usually based upon Fourier transform representations of reference functions/patterns that are to be "matched" to the input function.

Another coherent free space optical system that uses a similar architecture is the optical derivative processor that is described in EP2137590 (WO2008/110779). This prior art document is incorporated by reference. This employs specific filters to produce derivatives of the input function displayed on an input SLM. It is usual for the optical system to contain one or multiple focussing elements, such as lenses or curved mirrors, in order to produce the Optical Fourier Transform (OFT) of the function represented on the SLM. This is achieved when collimated light is illuminated on an SLM, with the SLM positioned in the front focal plane of the focussing element. The OFT is then produced at the rear focal plane of the focussing element, where either a camera or subsequent SLM is positioned. Other focussing elements that may be used include static diffractive optical elements, typically in the form of zone plates.

A camera such as a complementary metal-oxide-semiconductor (CMOS) sensor is typically positioned in the output plane of the optical system to capture the resulting optical intensity distribution, which in the case of an optical correlator system may contain localised correlation intensities denoting the similarity and relative alignment of the input and references functions. In the case of the optical derivative system, the camera would capture the resulting derivative of the input function.

Such optical systems, especially the 4f matched filter type of correlators suffer from high alignment tolerances, where the pixels of the input SLM must be spatially aligned to coincide with the pixels in the following SLM that may be positioned in the Fourier plane. Three prior art specific embodiments will now be described.

The most common function used in the type of coherent optical systems concerning both the prior art and the invention is the optical Fourier Transform (OFT)—the decomposition of a spatial or temporal distribution into its frequency components. This is analogous to the pure form of the two-dimensional Fourier transform denoted by the following equation:

$$G(u, v) = FT[g(x, y)] = \int\int_{\pm\infty} g(x, y)\exp[-i2\pi(ux + vy)]dxdy \quad (1)$$

Where: x,y=space/time variables, u,v=frequency variables

Figure 1:
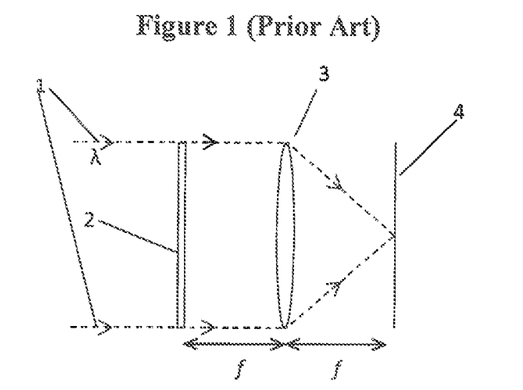
FIGS. 1 to 3 are optical path diagrams derived from the applicant's own prior art.

The OFT may be achieved by the optical system shown in FIG. 1 where collimated coherent light of wavelength $\lambda$ (typically laser light) 1 is modulated in phase or amplitude by a Spatial Light Modulator 2 (typically a liquid crystal or electro-mechanical MEMs array). The modulated beam is then passed through a positive converging lens 3, of focal length f and focussed in the back focal plane of the lens, where a detector such as a CMOS array 4 is positioned to capture the intensity of the resulting Fourier transform.

In optical processing systems, the OFT may be employed as a direct replacement of the electronic/software-based Fast Fourier Transform (FFT) family of algorithms, offering significant advantages in terms of process time and resolution. This process may be used as the basis of a variety of functions. The two functions of primary concern in this application are optical correlation (used in pattern recognition, comparison, or analysis) and derivative calculations.

Correlation between two or more functions may be achieved in an optical system in two main ways, either by a Matched Filter process, denoted by the following equation:

$$r(x,y)*g(x,y)=FT[R(u,v)*\times G(u,v)] \quad (2)$$

Where upper case functions represent the Fourier transform of their lower case equivalents; "*" indicates the complex conjugate of the adjacent function and "*" denotes the correlation function.

Or by a Joint Transform Correlation process, such as the 1/f JTC described in EP1546838 (WO2004/029746).

In each case the correlation is formed as the inverse Fourier transform of the product of two functions, which have themselves been Fourier transformed. This also forms the basis of how spectral derivative operations may be realised optically, as described in EP2137590 (WO2008/110779), using the following relationship:

$$g'(x,y)=FT[(i2\pi uv)^n G(u,v)] \quad (3)$$

Where g'(x, y) derivative of function g(x, y) of order n

Figure 2:
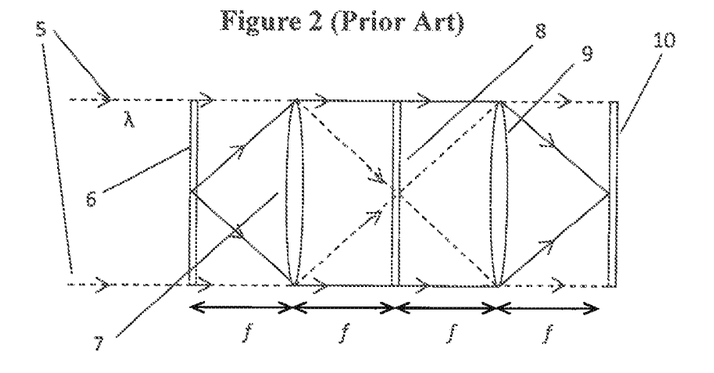

FIG. 2 shows a "4f" optical system that can be used to realise a matched filter or derivative process. Figure shows a collimated coherent light 5 of wavelength $\lambda$ which is modulated by SLM pixel array 6, and then transmitted through lens 7 and focussed on the second SLM pixel array 8, forming the OFT of the function displayed on the first SLM, at the pixels of the second SLM 8. The resulting optical matrix multiplication is then the inverse Fourier transformed by lens 9 and the result is captured at the detector array 10.

For a matched filter process, the pattern displayed by the pixels of the first SLM 6 will be the "input scene" g(x,y) and the pattern displayed on the second SLM 8 will represent a version of the Fourier transform of the reference function r(x,y).

For a derivative process, the pattern displayed by the second SLM 8 will be the complex function $(i2\pi uv)^n$ from equation (3). This may be represented by a combination of phase and amplitude patterns, as described in EP2137590 (WO2008/110779).

A recognised problem in the physical realisation of such optical systems, is the high spatial alignment criteria of the input and filter patterns displayed on the spatial light modulator components, together with the accurate positioning of the other system components, such as lenses and polarisers, etc. These tolerances may be of the order of a few microns, given that the pixel sizes for modern liquid crystal SLMs are of the order of 9 microns. Several methodologies have been proposed to alleviate these high tolerances in order to create optical systems that are both practically achievable and resistant to mechanical noise, vibration and shock, as well as gradual misalignment due to such factors as device and environmental temperature variations. Such solutions include folding the optical path to reduce both the overall size of the system as well as to reduce the number of discreet components required (such as the joint transform correlator (JTC) embodiment in patent EP2137590 (WO2008/110779)) and to replace the positive converging lenses with curved mirrors and static diffraction gratings such as zone plates. Extending the use of the spatial light modulator array to incorporate multiple data input patterns and placing the SLM on the same back plane as the detector array has also been proposed.

Figure 3:
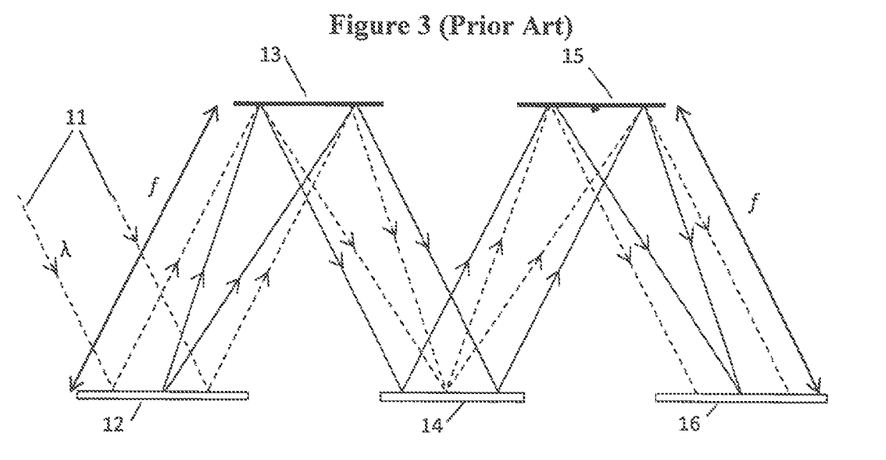

FIG. 3 shows such a folded arrangement, where a 4f-type system is outlined. Collimated coherent light 11 is employed as before as the information medium being transmitted through the optical system. The input in SLM 12 and reference/filter SLM 14 are now in the same plane as the detector array 16 and both SLMs are now considered as reflective devices (e.g. pixel arrays mounted upon a plane mirror). The lenses of FIG. 2 are now replaced by two reflective components 13, and 15, either as diffractive optical elements or positive curved mirrors, of focal length f.

However, the principles of the optical processing functions defined above have the potential to create extended processes, such as partial differential equation solving. An example of this is in the field of computational fluid dynamics (CFD), which is governed by the Navier-Stokes (NS) equations. These describe how the motion of a fluid may be determined by the forces acting upon it. Solving such a process by direct numerical simulation is a highly processor intensive operation—with high resolution examples being known to take weeks or even months to perform on the world's most powerful processor arrays and supercomputers. Indeed, it is a well-known problem that the serial nature of electronic processing is a fundamental limitation on the size and speed at which such processes may be performed, since the Fast Fourier transform operations that form the basis of such electronic processors are inherently parallel and do not scale well in terms of process time versus resolution. This is in addition to the amounts of data that must be managed to produce the operations. Furthermore, such processors produce overwhelming amounts of flow data (e.g. gigabytes) that must be sampled and discarded, or analysed over impractical amounts of time.

A form of the NS equations are shown in equation (4) below, in one dimensional form.

$$\rho\left(\frac{\partial u}{\partial t}+u\frac{\partial u}{\partial x}+v\frac{\partial u}{\partial y}+w\frac{\partial u}{\partial z}\right)=-\frac{\partial p}{\partial x}+\mu\left(\frac{\partial^2 u}{\partial x^2}+\frac{\partial^2 u}{\partial y^2}+\frac{\partial^2 u}{\partial z^2}\right)+\rho g_x \quad (4)$$

$$\rho\left(\frac{\partial v}{\partial t}+u\frac{\partial v}{\partial x}+v\frac{\partial v}{\partial y}+w\frac{\partial v}{\partial z}\right)=-\frac{\partial p}{\partial y}+\mu\left(\frac{\partial^2 v}{\partial x^2}+\frac{\partial^2 v}{\partial y^2}+\frac{\partial^2 v}{\partial z^2}\right)+\rho g_y$$

$$\rho\left(\frac{\partial w}{\partial t}+u\frac{\partial w}{\partial x}+v\frac{\partial w}{\partial y}+w\frac{\partial w}{\partial z}\right)=-\frac{\partial p}{\partial z}+\mu\left(\frac{\partial^2 w}{\partial x^2}+\frac{\partial^2 w}{\partial y^2}+\frac{\partial^2 w}{\partial z^2}\right)+\rho g_z$$

As can be noticed from the above equations, the building blocks of such equation solvers are analogous to those spectral derivative functions described above. Hence, if the functionality of the optical systems described above may be extended by incorporating multiple mathematical functions, there is the potential to provide step changing advantages, in terms of processing speed, resolution increases, data management and also electrical power consumption. Furthermore, optical correlation-based processing may also provide the means to analyse the currently overwhelming amounts of data being produced by the solver system.

However, practically realising such optical systems is unrealistic due to the alignment and tolerances of the physical components as described above.

The invention seeks to address at least some of the following problems:
the limitations of strict tolerances in rotation and translation of the prior art configurations;
the alignment problems of optical elements;
the inflexibility of the system in responding to changes in environmental conditions;
the overly complex and oversized prior art configurations;
the inability in practical terms of handling large processing tasks;
problems arising from optical crosstalk;
highly restrictive spatial alignment criteria; and
susceptibility to mechanical noise, vibration and shock, as well as gradual misalignment due to such factors as device and environmental temperature variations.

SUMMARY OF THE INVENTION

In a first broad independent aspect, the invention provides an optical processing system comprising an optical input; one or more spatial light modulator arrays; and a detector array; wherein at least one of said spatial light modulator arrays incorporates a plurality of data elements and focussing elements; said data elements and/or said focussing elements having multiple degrees of freedom. This is particularly advantageous because it allows advantageous configuration and reconfiguration of the elements in order to overcome the drawbacks outlined above. In particular, it allows advantageous alignment of the elements prior to initial use and during use so that the optical processing system may adapt to changing environmental conditions such as the temperature of the device or the temperature surrounding the device. Furthermore, by providing improvements in the alignment, strict tolerances can be adhered to, thus allowing complex, compact and low scale optical processing systems to be configured in order to provide practical solutions to complex processing problems.

In a subsidiary aspect, the optical processing system may be employed in free space diffractive optical processing in order to achieve a high degree of spatial alignment. The system may incorporate multiple optical and electro-optical elements each of which preferably having multiple degrees of freedom.

In a subsidiary aspect, said spatial light modulator array comprises a liquid crystal array and said focussing elements comprise pixelated patterns displayed by said liquid crystal array. This configuration is particularly advantageous in terms of avoiding having to employ lenses of the kind employed in the prior art described above.

In a further subsidiary aspect, the spatial light modulator array comprises a MEMs pixel array and said focussing elements comprise amplitude patterns displayed by said MEMs pixel array. This configuration is particularly advantageous in terms of providing an alternative construction to achieve the alignment benefits in order to provide a practical solution to solving complex processing functions. It also removes the drawbacks associated with the conventional lens arrangements of the prior art.

In a further subsidiary aspect, said focussing elements comprise a zone plate. This configuration is particularly advantageous in embodiments where these zone plates are integral with the spatial light modulator array which incorporates data elements.

In a further subsidiary aspect, the system further comprises a beam steering arrangement for shifting focussing elements, or altering beam steering patterns across the spatial light modulator; whereby a detected optical output matches the expected distribution and position of an intensity pattern captured by a detector array positioned at the output of the optical system. This is particularly advantageous in terms of correcting errors in alignment. This would particularly allow the optical processing system to respond in changes in environmental conditions during its use.

In a further subsidiary aspect, the detector array may be part of a camera or a photo detector array.

In a subsidiary aspect, the beam steering and detection arrangement employs diffraction patterns. In a further subsidiary aspect, said beam steering and detection arrangement employs blaze gratings.

In a further subsidiary aspect, the system further comprises a software algorithm for shifting or altering focussing elements or beam steering patterns until the required intensity distribution is detected. This configuration is particularly advantageous in terms of providing a system which may in certain embodiments automatically align or self-align in order to provide efficient and correct solving of complex functions.

In a further subsidiary aspect, said spatial light modulator array is a high resolution transmissive or reflective liquid crystal or MEMs array; and wherein multiple elements are arranged in the same plane. In a preferred embodiment, the multiple optical components are arranged in the same plane by means of tiling discreet arrays, or by using one very high resolution array. This configuration is particularly advantageous when implementing the system in the context of free space diffractive optical systems. In particular it provides advantageous compact and reliable operation.

In a further subsidiary aspect, the system further comprises a reflector which faces said reflective or transmissive pixel array; whereby the optical path is folded. This configuration is particularly advantageous when implemented in the context of diffractive optical processing systems. Preferably, the focussing and beam steering patterns and data arrays are arranged on a single array panel and the optical path is folded by a means of one or more mirrors.

In a further subsidiary aspect, this system may be adapted to implement diffractive optical processing capable of at least one of: single stage matrix field operations, multiple stage matrix field operations and Fourier transform operations; wherein numerical data is entered by means of phase or amplitude arrays on one or multiple liquid crystal or MEMs pixel arrays.

In a further subsidiary aspect, data elements and focussing elements are arranged on multiple opposing array panel layers. This provides the ability to resolve complex functions.

In a further subsidiary aspect, focussing elements and data elements are configured to be simultaneously addressed on the same pixel array. This would allow advantageous reconfiguration in order to dynamically solve alignment problems.

In a further subsidiary aspect, at least two reflective liquid crystal panels are located either side of at least one transmissive liquid crystal panel.

In a further subsidiary aspect, the spatial light modulator incorporates multiple layers and said system further comprises a grid located between at least two layers for blocking and/or absorbing high order Fourier components. This provides a mechanism to minimise or do away substantially with optical crosstalk noise.

In a further subsidiary aspect, the electronic synchronisation of displaying the multiple focussing, steering and data array patterns may be optimised by simultaneously addressing them on the same pixel array. In a further subsidiary aspect, a means of auto-adjusting the configuration allows calibration, and correction of noise aberrations and focussing errors which may be due for example to temperature variations and displacement by mechanical shock.

In a further subsidiary aspect, the optical system allows a dynamic reconfiguration by changing the arrangement, positions and types of diffraction patterns being used.

DETAILED DESCRIPTION OF EMBODIMENTS OF THE INVENTION

Figure 4:
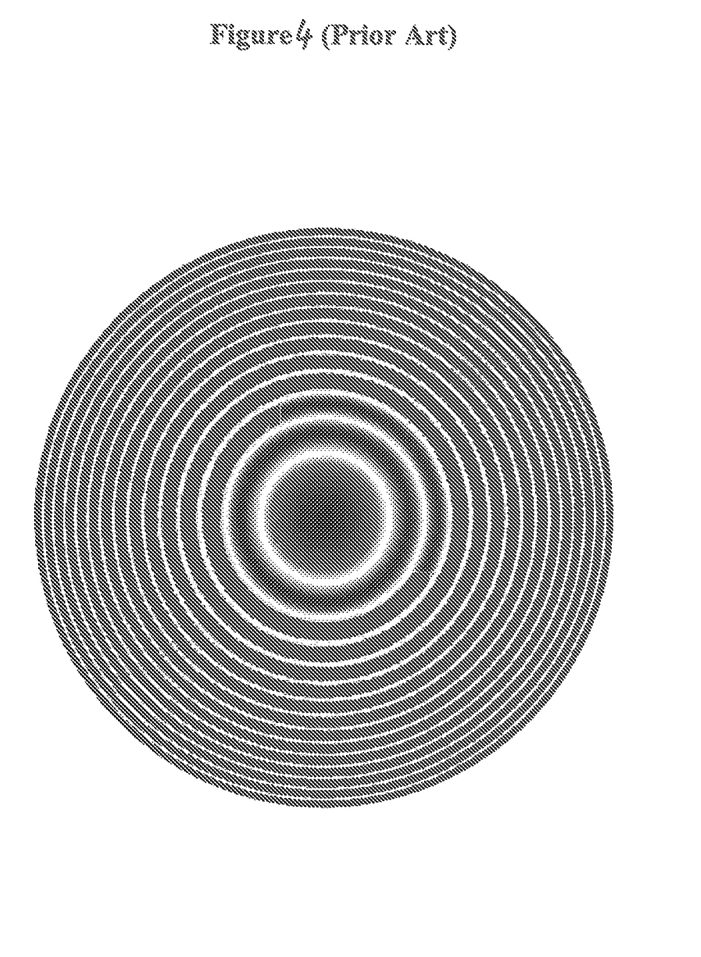
FIG. 4 shows a zone plate of a known kind.
Figure 5:
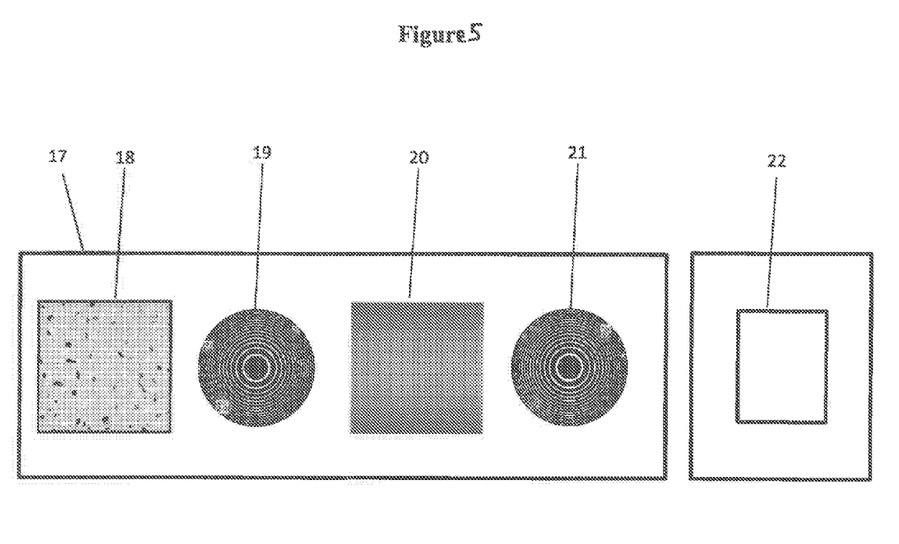
FIG. 5 shows a 4f derivative process realised by employing a single high resolution pixel array.

FIG. 5 shows an embodiment of how the derivative process described above may be realised in accordance with the invention. A high resolution pixel array 17 contains several million pixels. Arranged within the array are the input scene g(x,y) 18, first focussing element 19, filter array r(x,y) 20, second focussing element 21 and detector array 22. Each one of the focussing elements 19 and 21 may be a zone plate of the kind shown in FIG. 4. The pixel array 17 is preferably reflective and may be mounted on a plane mirror. Opposing the array 17 there may be provided another plane mirror located at a distance of f/2 away from the array such that the distance travelled by the light beam between a focussing elements and numerical data represented on the array would match the effective focal length f of the focussing elements 19 and 21. The coherent light would then be reflected back and forth, such that each of the data and focusing stages would form a successive optical path resulting in the output distribution being incident on detector 22.

By employing this method, the problem of the high alignment tolerances is alleviated, since focussing and positioning the components of the optical system (beyond initially positioning the SLM array layers) now becomes a software process. Rotational tolerances are minimised by having the data arrays positioned on the same physical grid.

Spatial/translational alignment is achieved by using a software management algorithm to produce the target optical output on the detector array by a combination of shifting the positions of the numerical data on the pixel array, and changing the focus via modification of the zone plate patterns. Furthermore, beam steering patterns, such as phase ramps or other such patterns may be used to steer the beam according to the required optical path.

Figure 6:
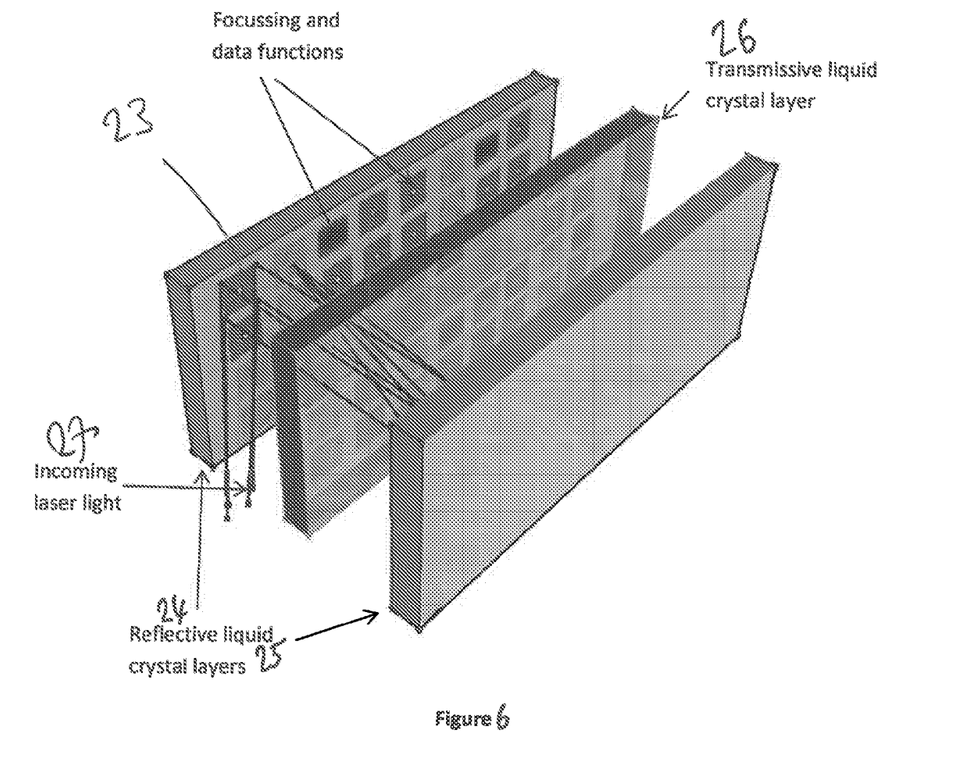
FIG. 6 shows a perspective view of an optical processing system in accordance with a further embodiment of the invention.

FIG. 6 shows how by replacing the static focusing elements on the optical system, with zone plates such as zone plate 23 displayed on a liquid crystal (or other) SLM, multiple function coherent optical systems may be realised by using opposing high resolution reflective liquid crystal panels such as panel 24 and 25 which may be set to display multiple focussing elements, input functions, reference/derivative filters. Multiple transmissive liquid crystal panels such as panel 26 may be inserted between the opposing reflective liquid crystal panels to add further optical function elements.

With this embodiment, rotational and translational tolerances may be taken care of by way of using the same liquid crystal panel to display the subsequent focussing or data functions. Such a system would be dynamic and reprogrammable, whilst being extremely compact and of low size and mass. By using very high resolution liquid crystal panels the resulting optical system may be able to perform extremely large processing tasks, such as solving large partial differential equations, for example the Navier-Stokes equations that are the basis of computational fluid dynamics.

FIG. 6 shows the arrangement of two opposing reflective liquid crystal panels 24 and 25 with one single transmissive liquid crystal panel 26. Also shown is a collimated laser beam 27 and the first few interactions of the beam with the focussing and data elements. The camera device is not shown but would be positioned wherever the end of the optical system would be positioned. Multiple laser beams could also be employed to produce multiple optical paths through the system.

To prevent optical crosstalk in the system from high orders resulting from the Fourier plane distributions in the system, a honeycomb-style grid may be inserted between the liquid crystal panels to act as a light trap, with care being taken not to dip the beams.

Figure 7:
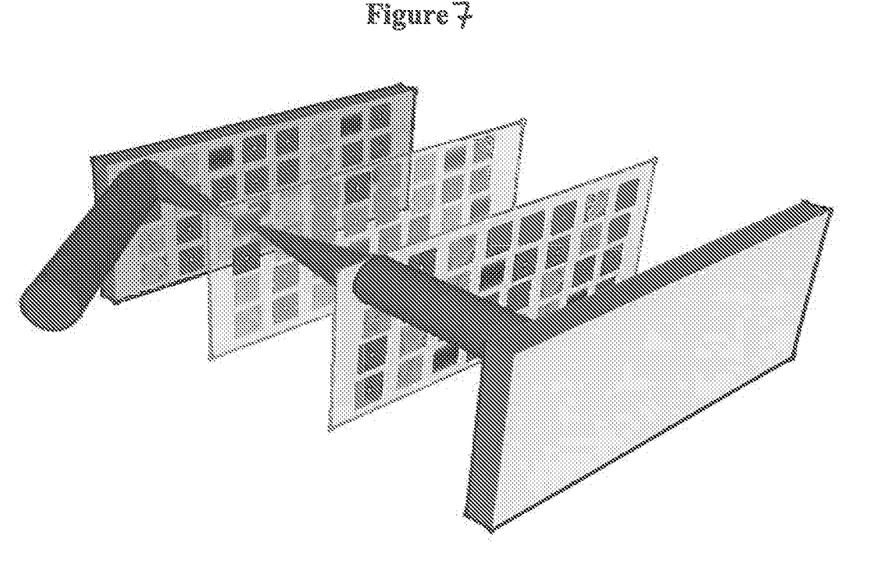
FIG. 7 shows a perspective view of a further embodiment of the invention.

FIG. 7 shows how the 4f optical system may be extended by adding further functions into the optical path by employing multiple high resolution pixel arrays. For simplicity, the figure only shows the partial voyage of the light beam. Multiple light beams from multiple optical sources may also be used and combined as required through the system. The final detector array, or arrays (not shown) are positioned at the output of the system.

In addition to the alignment and stabilisation features of the claimed configurations, the method also allows the optical path and functionality to be altered since the data array and optical elements are all dynamically addressable. Multiple optical systems may therefore be realised using the same hardware components, creating a reconfigurable and dynamic arrangement. This may be particularly useful in PDE-type solver systems, where the flow data may be generated and stored temporarily in electronic form, then analysed using the same hardware, reconfigured as an optical pattern recognition system—without the need for any physical realignment or adjustment.

One further consideration is in dealing with the higher order Fourier components that will be present in the multiple Fourier planes that are created in the system. These may create optical crosstalk noise as they overlap other parts of the preceding and following beam stages. To counter this, a honeycomb-style grid may be placed between the pixel layers to block and absorb these high order components.

The above embodiment may relate not only to the solving of PDE-type equations and optical pattern recognition, but also more general mathematical operations, in particular matrix multiplication. Other mathematical operations such as addition may be achieved a through the use of multiple beams being combined at each state through the optical path.

Figure 8:
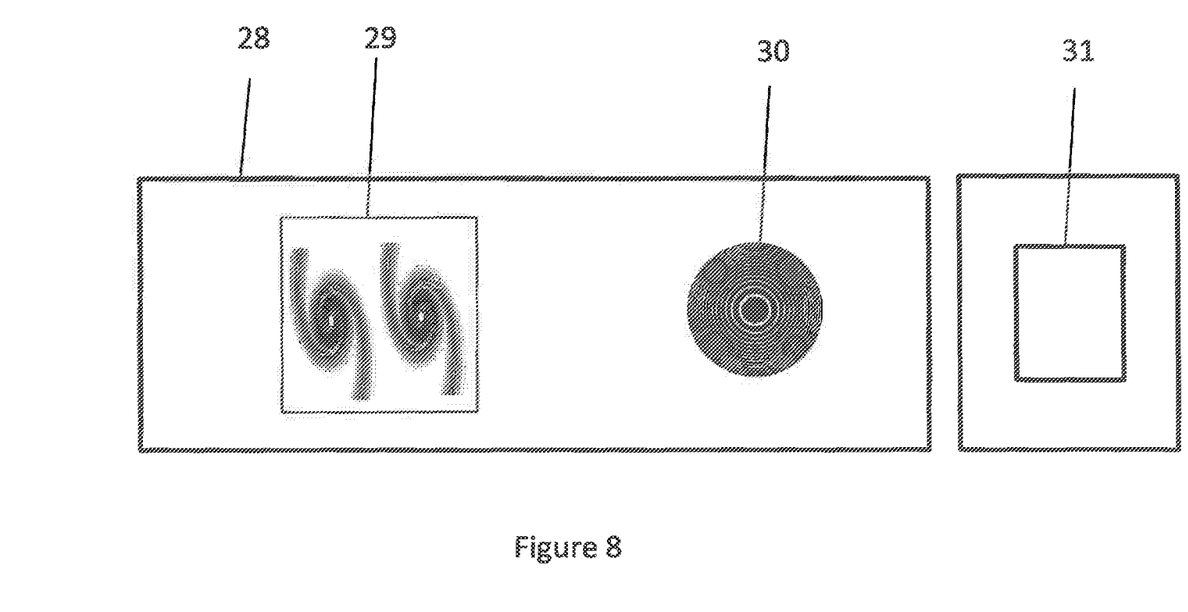
FIG. 8 shows a further embodiment of the invention where data and focussing elements are shown side by side.

FIG. 8 shows how the same system described in FIG. 6 may be dynamically reconfigured into a different optical process by changing the information being addressed. Shown is a single Fourier transform stage which may be used as the 1/f Joint Transform Correlator described in EP1546838. Here, the reflective SLM pixel array layer 28 displays an input scene 29 comprising of an input and reference function for comparison. Again, not shown is a plane mirror facing the SLM array positioned a distance of f/2 from the SLM array. Collimated laser light (which may be collimated and angled using the same zone plate and beam steering method described earlier) illuminates the input scene 29 and is reflected to the plane mirror opposite. This is then reflected to illuminate the zone plate 30 (of effective focal length f), which in turn focuses the beam on the detector array 31. The captured intensity pattern represents the intensity distribution of the Fourier transform of the input scene, known as the Joint Power Spectrum. For a 1/f JTC operation, this is then electronically thresholded/processed and the result undergoes a second Fourier transform to produce the correlation plane. This second Fourier transform could use the same system layout described here, replacing the input scene with the processed Joint Power Spectrum.

The invention claimed is:

1. An optical processing system comprising:
   an optical input;
   at least one spatial light modulator layer; and
   a detector array;
   wherein said at least one spatial light modulator layer incorporates a liquid crystal array with a pixelated input data pattern and a pixelated focussing pattern displayed by said liquid crystal array;
   wherein said system further comprises an optical output which is produced by a combination of shifting the positions of the pixelated input data pattern and a modification of said pixelated focussing pattern;
   whereby spatial or translational alignment is achieved; and
   wherein said liquid crystal array comprises at least two reflective liquid crystal panels located on either side of at least one transmissive liquid crystal panel.

2. A system according to claim 1, wherein said focussing pattern is a zone plate pattern.

3. A system according to claim 1, further comprising beam steering patterns to steer the beam according to the required optical path.

4. A system according to claim 3, wherein said beam steering patterns incorporate phase ramps.

5. A system according to claim 1, further comprising a beam steering arrangement for shifting focussing patterns or altering beam steering patterns across the spatial light modulator;
   whereby a detected optical output matches the expected distribution and position of an intensity pattern captured by a detector array positioned at the output of the optical system.

6. A system according to claim 5, wherein said beam steering arrangement employs diffraction patterns.

7. A system according to claim 6, wherein said beam steering arrangement employs blaze gratings.

8. A system according to claim 5, further comprising a software algorithm for shifting or altering a focussing pattern or a beam steering pattern until the required intensity distribution is detected.

9. A system according to claim 1, adapted to implement diffractive optical processing capable of at least one of: single stage matrix field operations, multiple stage matrix field operations or Fourier transform operations;
   wherein numerical data is entered via phase or amplitude arrays on one or multiple liquid crystal pixel arrays.

10. A system according to claim 1, wherein data patterns and focussing patterns are arranged on multiple opposing array panel layers.

11. A system according to claim 1, wherein focussing patterns and data patterns are configured to be simultaneously addressed on the same pixel array.

12. A system according to claim 1, wherein the spatial light modulator incorporates multiple layers and said system further comprises a grid located between at least two layers for blocking and/or absorbing high order Fourier components.

13. An optical correlation based processing system, comprising an optical processing system according to claim 1.

14. An optical pattern recognition system, comprising an optical processing system according to claim 1.

15. An optical derivative processing system, comprising an optical processing system according to claim 1.

16. An optical equation solving system, comprising an optical processing system according to claim 1.

17. An optical system for mathematical operations, comprising an optical processing system according to claim 1.

* * * * *